(12) United States Patent
Takami et al.

(10) Patent No.: US 12,069,397 B2
(45) Date of Patent: Aug. 20, 2024

(54) VIDEO PROCESSING APPARATUS, VIDEO PROCESSING SYSTEM AND VIDEO PROCESSING METHOD

(71) Applicant: JVCKENWOOD Corporation, Yokohama (JP)

(72) Inventors: Hatsuaki Takami, Yokohama (JP); Yoshihito Kinoshita, Yokohama (JP); Kodai Nakamura, Yokohama (JP); Hirotsugu Tsuchiya, Yokohama (JP); Hideharu Endo, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 47 days.

(21) Appl. No.: 17/934,589

(22) Filed: Sep. 23, 2022

(65) Prior Publication Data

US 2023/0015232 A1    Jan. 19, 2023

Related U.S. Application Data

(63) Continuation of application No. PCT/JP2020/047125, filed on Dec. 17, 2020.

(30) Foreign Application Priority Data

Jun. 10, 2020    (JP) .................................. 2020-101177

(51) Int. Cl.
*H04N 5/265*    (2006.01)
*H04N 5/262*    (2006.01)
(Continued)

(52) U.S. Cl.
CPC ........... *H04N 5/265* (2013.01); *H04N 5/2628* (2013.01); *H04N 23/698* (2023.01); *H04N 23/90* (2023.01)

(58) Field of Classification Search
CPC .... H04N 5/265; H04N 5/2628; H04N 23/698; H04N 23/90; H04N 23/951; H04N 7/18; B60R 1/27
See application file for complete search history.

(56) References Cited

U.S. PATENT DOCUMENTS

2009/0160940 A1    6/2009    Imamura
2015/0183371 A1    7/2015    Okada et al.
(Continued)

FOREIGN PATENT DOCUMENTS

JP    2010166196 A    7/2010
JP    2015-080107 A    4/2015

OTHER PUBLICATIONS

Extended European Search Report from EP Application No. 20939957.5 mailed Oct. 20, 2003, 9 pages.
(Continued)

*Primary Examiner* — Michael Lee
(74) *Attorney, Agent, or Firm* — Shih IP Law Group, PLLC (57) ABSTRACT

A main video acquisition unit acquires main video data including a video area of a shape having a curved portion from a main picture-capturing unit installed at a predetermined position in a moving object. A sub-video acquisition unit acquires sub-video data from sub-picture capturing units installed at different positions in the moving object. A combiner combines video data that is generated on the basis of the sub-video data and has a shape fitting to a free area other than the video area of each frame of the main video data, and arranges the video data in the free area. A file generator generates one moving picture file based on the combined video data.

6 Claims, 9 Drawing Sheets

(51) Int. Cl.
  *H04N 23/698*  (2023.01)
  *H04N 23/90*   (2023.01)

(56) References Cited

U.S. PATENT DOCUMENTS

| | | | | |
|---|---|---|---|---|
| 2016/0360104 | A1* | 12/2016 | Zhang | G06T 15/205 |
| 2017/0232898 | A1* | 8/2017 | Maejima | H04N 23/90 |
| | | | | 348/118 |
| 2019/0202353 | A1* | 7/2019 | Wu | G06T 3/60 |
| 2020/0137322 | A1* | 4/2020 | Yokota | H04N 21/47 |
| 2021/0383513 | A1* | 12/2021 | Mukai | B60R 1/27 |
| 2021/0397879 | A1* | 12/2021 | Yamamoto | H04N 23/80 |

OTHER PUBLICATIONS

International Search Report for the corresponding PCT Application No. PCT/JP2020/047125 mailed Mar. 9, 2021, 4 pages.

* cited by examiner

VIDEO PROCESSING APPARATUS, VIDEO PROCESSING SYSTEM AND VIDEO PROCESSING METHOD

CROSS-REFERENCE TO RELATED APPLICATION

This application is a Continuation of International Application No. PCT/JP2020/047125, filed on Dec. 17, 2020, which in turn claims the benefit of Japanese Application No. 2020-101177, filed on Jun. 10, 2020, the disclosures of which Application is incorporated by reference herein.

BACKGROUND OF THE INVENTION

1. Field

The present invention relates to a video processing apparatus and a video processing system that process a video captured using an ultrawide-angle lens.

2. Description of the Related Art

In recent years, drive recorders capable of recording a video in all directions of front, rear, left, and right of a vehicle at 360° have become widespread. For example, four cameras may be installed on the front, rear, left, and right of the vehicle, and an ultra-wide angle camera may be installed on the ceiling of the vehicle interior so as to look down the vehicle interior. The video captured by the ultra-wide angle camera using a fisheye lens or the like is a circular video (see, for example, Patent Literature 1). A general video recording format is intended to record a rectangular video on a frame-by-frame basis. Thus, in a case of recording a video captured by the ultra-wide angle camera in a general recording format, useless areas are generated at four corners.

[Patent Literature 1] JP 2015-80107A

As described above, in a case of capturing and recording videos simultaneously by a plurality of cameras installed on a vehicle, a file of video data is generated for each camera. At the time of reproduction, combination and synchronization management of the video data captured by the plurality of cameras tend to be complicated.

SUMMARY OF THE INVENTION

A video processing apparatus according to one aspect of the present embodiment includes: a first acquisition unit that acquires main video data including a video area of a shape having a curved portion from a main picture capturing unit installed at a predetermined position in a moving object; a second acquisition unit that acquires sub-video data from a sub-picture capturing unit installed at another position in the moving object; a combiner that combines video data that is generated on the basis of the sub-video data and has a shape fitting to a free area other than the video area of each frame of the main video data, and arranges the video data in the free area; and a generator that generates one moving picture file on the basis of the combined video data.

Another aspect of the present embodiment is a video processing method. This method includes: acquiring main video data including a video area of a shape having a curved portion from a main picture capturing unit installed at a predetermined position in a moving object; acquiring sub-video data from a sub-picture capturing unit installed at another position in the moving object; combining video data that is generated on the basis of the sub-video data and has a shape fitting to a free area other than the video area of each frame of the main video data, and arranges the video data in the free area; and generating one moving picture file on the basis of the combined video data.

It should be noted that any combination of the above-described components and mutual exchanges of methods, devices, systems, recording media, computer programs and the like described in relation to the present embodiment are also effective as aspects of the present embodiment.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

The invention will now be described by reference to the preferred embodiments. This does not intend to limit the scope of the present invention, but to exemplify the invention.

First Embodiment

Figure 1A:
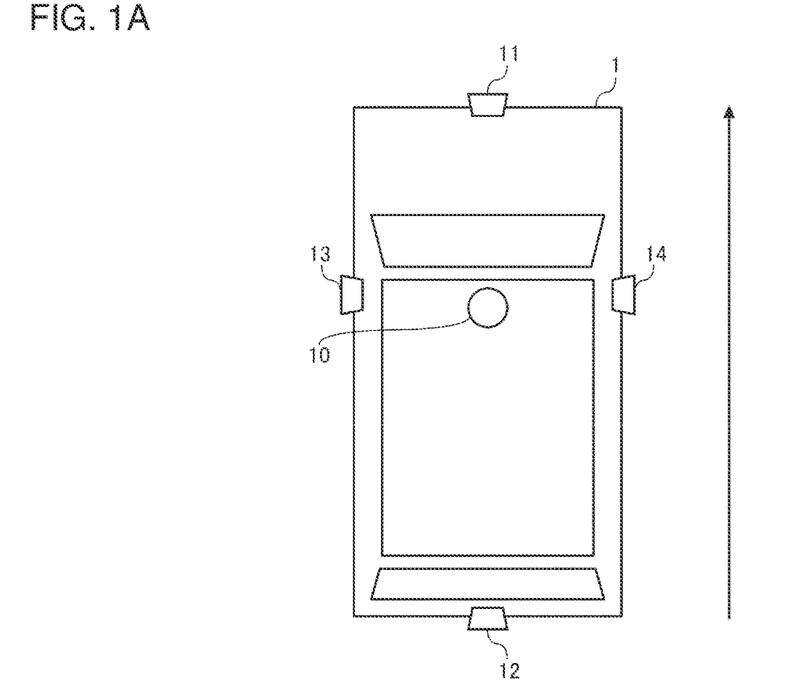
FIGS. 1A and 1B are diagrams illustrating an arrangement example of a main picture capturing unit and four sub-picture capturing units installed on a vehicle, constituting a video processing system according to a first embodiment.
Figure 1B:
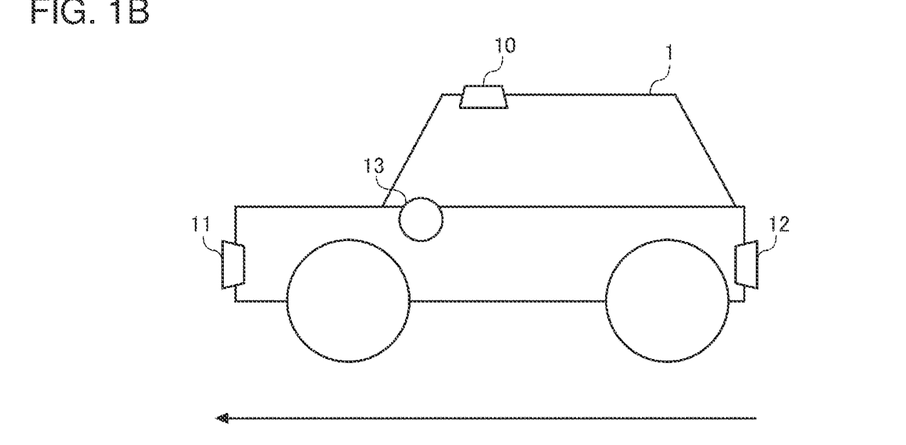

FIGS. 1A and 1B are diagrams illustrating an arrangement example of a main picture capturing unit 10 and four sub-picture capturing units 11 to 14 installed on a vehicle 1, constituting a video processing system according to a first embodiment. FIG. 1A is a top view of the vehicle 1, and FIG. 1B is a left-side view of the vehicle 1. The main picture capturing unit 10 includes a camera having an ultrawide-angle lens. In the present embodiment, it is assumed that the ultrawide-angle lens is a circumferential fisheye lens capable of covering the front, rear, left, and right of the vehicle 1 having an angle of view of 180° and the entire hemispherical periphery of the vehicle interior. As illustrated in FIGS. 1A and 1B, in the present embodiment, the main picture capturing unit 10 is installed downward on the ceiling of the vehicle interior so as to look down the vehicle interior, and captures a picture of a scene outside the vehicle interior.

In the first embodiment, a plurality of sub-picture capturing units 11-14 is installed outside the vehicle 1 in order to compensate for a blind spot of the main picture capturing unit 10 or insufficient resolution in a neighboring portion. It is assumed that the plurality of sub-picture capturing units 11 to 14 includes a camera having a general wide-angle lens with less distortion of the neighboring picture than the circumferential fisheye lens. In the first embodiment, the first sub-picture capturing unit 11 is installed on the front side of the vehicle 1, the second sub-picture capturing unit 12 is installed on the rear side of the vehicle 1, the third sub-picture capturing unit 13 is installed on the left side of the vehicle 1, and the fourth sub-picture capturing unit 14 is installed on the right side of the vehicle 1.

In the example illustrated in FIGS. 1A and 1B, the first sub-picture capturing unit 11 is attached to the front grille and captures a picture of a scene in front of the vehicle 1. The second sub-picture capturing unit 12 is attached to the rear grill and captures a picture of a scene behind the vehicle 1. The third sub-picture capturing unit 13 is attached to the left side mirror and captures a picture of a scene on the left side of the vehicle 1. The fourth sub-picture capturing unit 14 is attached to the right side mirror and captures a picture of a scene on the right side of the vehicle 1.

Figure 2:
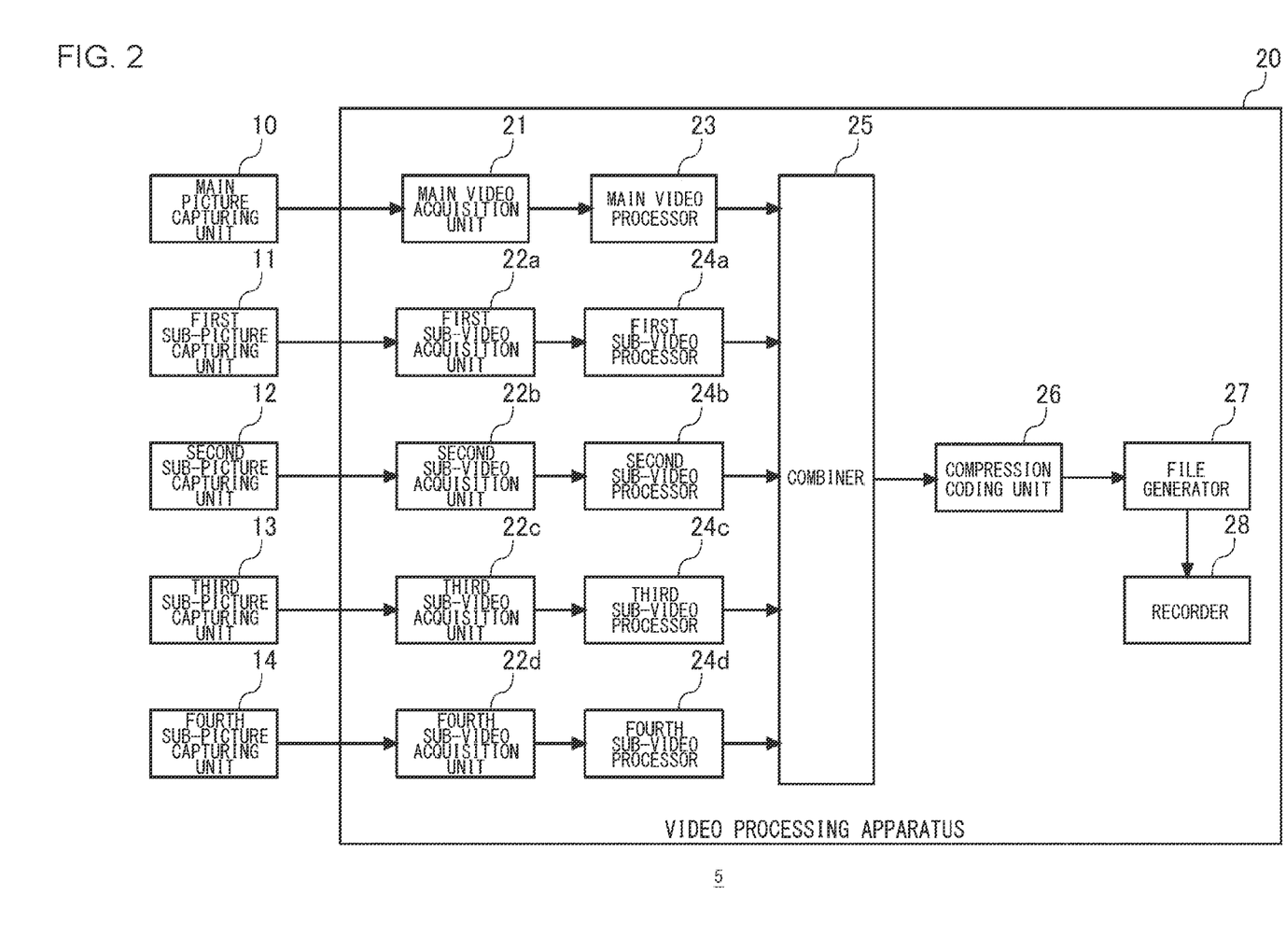
FIG. 2 is a block diagram illustrating a configuration of the video processing system according to the first embodiment.

FIG. 2 is a block diagram illustrating a configuration of a video processing system 5 according to the first embodiment. The video processing system 5 according to the first embodiment includes a main picture capturing unit 10, a first sub-picture capturing unit 11, a second sub-picture capturing unit 12, a third sub-picture capturing unit 13, a fourth sub-picture capturing unit 14, and a video processing apparatus 20. The main picture capturing unit 10, the first sub-picture capturing unit 11, the second sub-picture capturing unit 12, the third sub-picture capturing unit 13, and the fourth sub-picture capturing unit 14 are connected to the video processing apparatus 20 by cables. At least one of the main picture capturing unit 10, the first sub-picture capturing unit 11, the second sub-picture capturing unit 12, the third sub-picture capturing unit 13, and the fourth sub-picture capturing unit 14 may be wirelessly connected to the video processing apparatus 20 as long as requirements for real-time property and noise resistance are satisfied.

The main picture capturing unit 10 includes an ultrawide-angle lens, a solid-state picture capturing element, and a signal processing circuit. The solid-state picture capturing element converts light entered through the ultrawide-angle lens into an electrical video signal and outputs the electrical video signal to the signal processing circuit. The solid-state picture capturing element may be a complementary metal oxide semiconductor (CMOS) image sensor or a charge coupled devices (CCD) image sensor, for example. The signal processing circuit performs signal processing such as A/D conversion and noise removal on a video signal input from the solid-state picture capturing element, and outputs the video signal to the video processing apparatus 20. The configurations of the first sub-picture capturing unit 11 to the fourth sub-picture capturing unit 14 are also similar to the configuration of the main picture capturing unit 10 except for the shape of the lens and specifications of circuit components.

The video processing apparatus 20 includes a main video acquisition unit 21, a first sub-video acquisition unit 22a, a second sub-video acquisition unit 22b, a third sub-video acquisition unit 22c, a fourth sub-video acquisition unit 22d, a main video processor 23, a first sub-video processor 24a, a second sub-video processor 24b, a third sub-video processor 24c, a fourth sub-video processor 24d, a combiner 25, a compression coding unit 26, a file generator 27, and a recorder 28.

The configurations of the main video acquisition unit 21 to the file generator 27 of video processing apparatus 20 can be realized by cooperation of hardware resources and software resources or by only hardware resources. As the hardware resources, a CPU, a ROM, a RAM, a graphics processing unit (GPU), a digital signal processor (DSP), an application specific integrated circuit (ASIC), a field-programmable gate array (FPGA), and other LSIs can be used. As the software resources, programs such as firmware can be used.

The main video acquisition unit 21 acquires main video data including a circular video area from the main picture capturing unit 10. The main video acquisition unit 21 outputs the acquired main video data to the main video processor 23. The circular video area herein is a concept including not only a true circular video area but also an elliptical video area and a distorted circular video area.

Normally, since the pixels of the solid-state picture capturing element are arranged in a rectangle, even if the lens is an ultrawide-angle circumferential fisheye lens, the main video data output from the main picture capturing unit 10 is rectangular data including a circular video area therein. In each frame of the main video data, an area other than the circular video area is a free area not including video information. When the main video data is reproduced without performing view angle conversion, the free area is displayed as a black background.

The first sub-video acquisition unit 22a to the fourth sub-video acquisition unit 22d acquire the first sub-video data to the fourth sub-video data from the first sub-picture capturing unit 11 to the fourth sub-picture capturing unit 14, respectively. The first sub-video acquisition unit 22a to the fourth sub-video acquisition unit 22d output the acquired first sub-video data to fourth sub-video data to the first sub-video processor 24a to the fourth sub-video processor 24d, respectively.

The first sub-video processor 24a to the fourth sub-video processor 24d process the first sub-video data to the fourth sub-video data to generate video data having the shape of the free area of each frame of the main video data. Hereinafter, a specific description will be given with reference to FIGS. 3 to 5.

Figure 3:
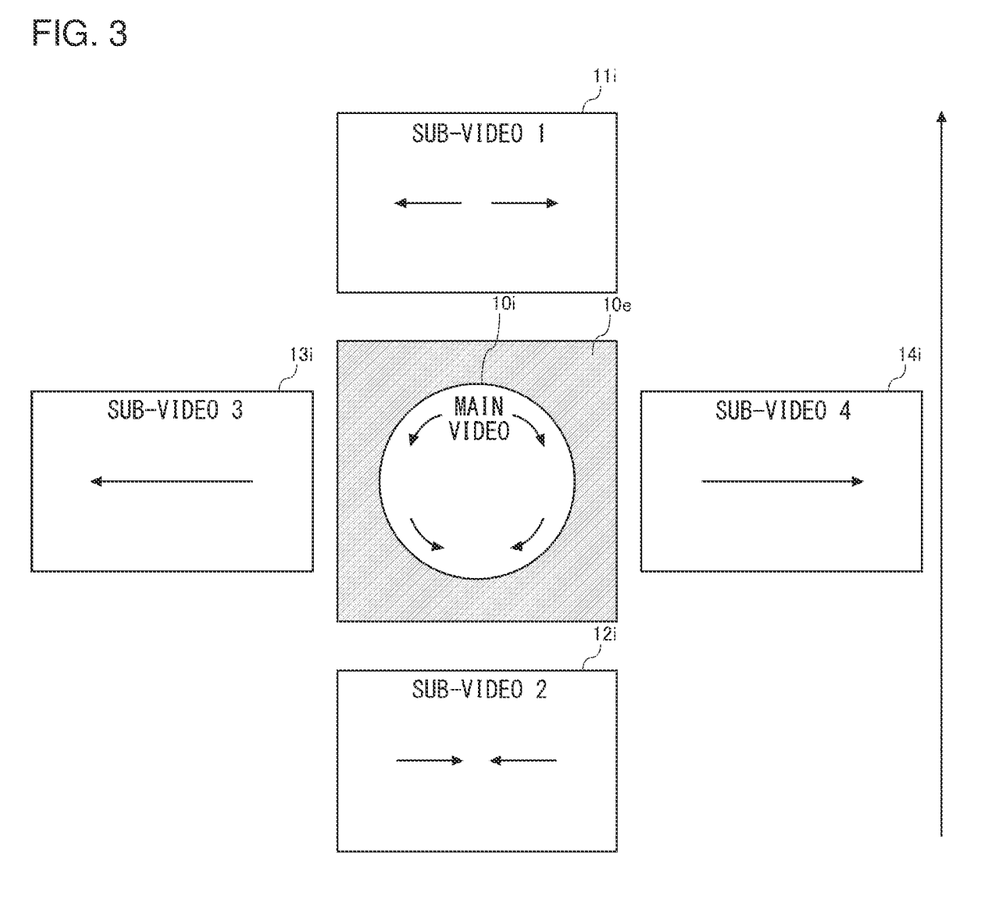
FIG. 3 is a diagram for describing a main video and a first sub-video to a fourth sub-video respectively captured by a main picture capturing unit and a first sub-picture capturing unit to a fourth sub-picture capturing unit, respectively, according to the first embodiment.

FIG. 3 is a diagram for describing a main video 10i and a first sub-video 11i to a fourth sub-video 14i captured by the main picture capturing unit 10 and the first sub-picture capturing unit 11 to the fourth sub-picture capturing unit 14, respectively, according to the first embodiment. A hatched area not including the video information in the main video data is indicated as a free area 10e. In FIG. 3, the motions of the scenes seen in the main video 10i, the first sub-video 11i, the second sub-video 12i, the third sub-video 13i, and the fourth sub-video 14*i* in the state where the vehicle 1 moves forward are indicated by arrows. The scenes in the videos are the scenes flowing in a direction opposite to the direction in which the vehicle 1 moves.

Since the vehicle 1 moves forward (In FIG. 3, the vehicle 1 moves from bottom to top), the scene seen in the main video 10*i* is a scene flowing backward. Specifically, the scene flows from top to bottom. Since the video captured through the ultrawide-angle lens is a round distorted video, in an area close to the circumference, the scene in the video becomes a scene flowing from top to bottom along the circumference. The scene seen in the first sub-video 11*i* is a scene spreading from the center to the periphery. The scene seen in the second sub-video 12*i* is a scene drawn from the periphery to the center. The scene seen in the third sub-video 13*i* is a scene flowing from right to left. The scene seen in the fourth sub-video 14*i* is a scene flowing from left to right.

When the vehicle 1 moves backward (In FIG. 3, the vehicle 1 moves from top to bottom), the motions of the scene seen in the main video 10*i*, the first sub-video 11*i*, the second sub-video 12*i*, the third sub-video 13*i*, and the fourth sub-video 14*i* are the motions in the directions opposite to the directions of the arrows illustrated in FIG. 3.

Figure 4:
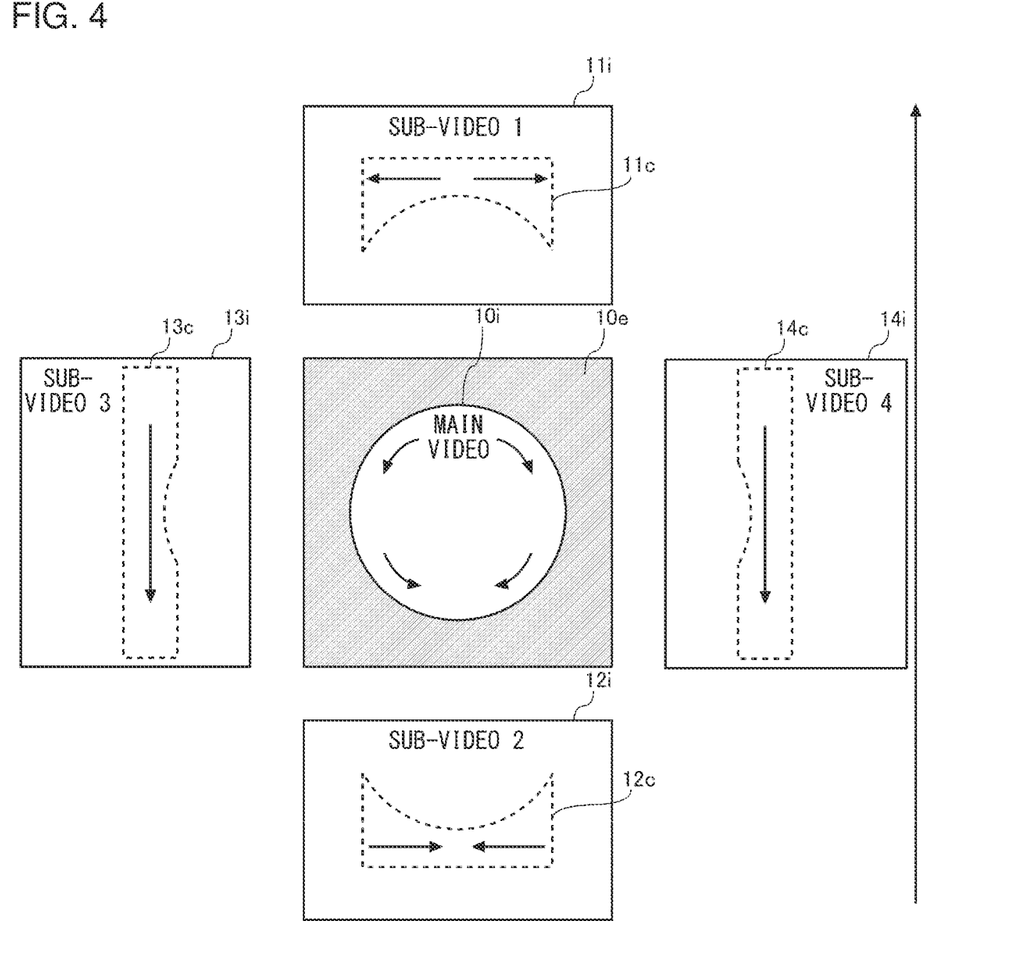
FIG. 4 is a diagram for describing modified processing of the main video and the first sub-video to the fourth sub-video respectively captured by the main picture capturing unit and the first sub-picture capturing unit to the fourth sub-picture capturing unit, respectively, according to the first embodiment.
Figure 5:
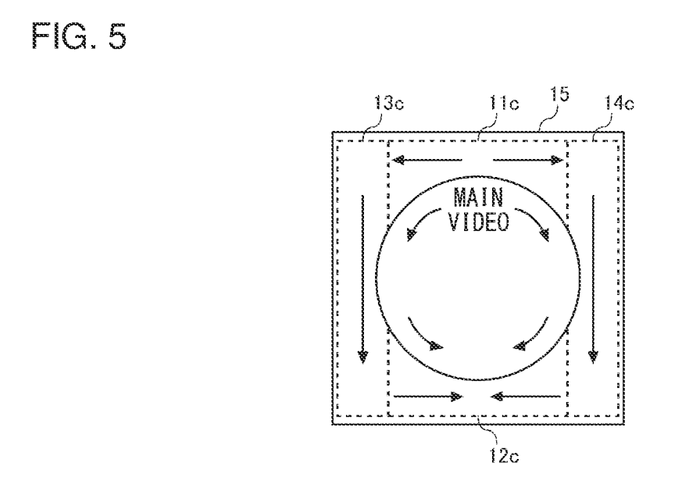
FIG. 5 is a diagram illustrating a combined video in which four pieces of partial video data are arranged in a main video.

FIG. 4 is a diagram for describing modified processing of the main video 10*i* and the first sub-video 11*i* to the fourth sub-video 14*i* captured by the main picture capturing unit 10 and the first sub-picture capturing unit 11 to the fourth sub-picture capturing unit 14, respectively, according to the first embodiment. In the example of FIGS. 3 to 5, the first sub-video 11*i* is arranged in the free area 10*e* above the main video 10*i*, the second sub-video 12*i* is arranged in the free area 10*e* below main video 10*i*, the third sub-video 13*i* is arranged in the free area 10*e* on the left of the main video 10*i*, and the fourth sub-video 14*i* is arranged in the free area 10*e* on the right of the main video 10*i*.

The main video processor 23 and the first sub-video processor 24*a* to the fourth sub-video processor 24*d* execute various processes on the main video data and the first sub-video data to the fourth sub-video data as pre-processing before combining the videos. For example, in a case where the resolution of the solid-state picture capturing element of the main picture capturing unit 10 is different from the resolution of the solid-state picture capturing elements of the first sub-picture capturing unit 11 to the fourth sub-picture capturing unit 14, the following process is executed by at least one of the main video processor 23 and the first sub-video processor 24*a* to the fourth sub-video processor 24*d*. At least one of a thinning or interpolating process of the main video data by the main video processor 23 and a thinning or interpolating process of the first sub-video data to the fourth sub-video data by the first sub-video processor 24*a* to the fourth sub-video processor 24*d* is executed so that the resolution of the main video data coincides with the resolution of the first sub-video data to the fourth sub-video data.

The main video processor 23 may execute enlargement or reduction processing of the video area of the circular main video 10*i*. For example, when the first sub-video data to the fourth sub-video data are stored separately from the main video data, the main video processor 23 may enlarge the circular video area to the maximum. On the contrary, when the first sub-video data to the fourth sub-video data are discarded without being stored, the main video processor 23 may reduce the circular video area. In this case, more free area 10*e* can be obtained, and more information of the first sub-video 11*i* to the fourth sub-video 14*i* can be left.

In order to reduce the distortion of the main video 10*i*, the main video processor 23 may subject the main video data to coordinate transformation by a predetermined projective transform method on the basis of a distortion parameter set according to the viewing angle of the ultrawide-angle lens of the main picture capturing unit 10.

The first sub-video processor 24*a* to the fourth sub-video processor 24*d* deform the first sub-video data to the fourth sub-video data so as to bring motion vectors of the first sub-video 11*i* to the fourth sub-video 14*i* closer to the motion vector of the area neighboring to the free area 10*e* in the main video 10*i* according to the motion of the vehicle 1. In the example illustrated in FIG. 4, the third sub-video processor 24*c* rotates the third sub-video data counterclockwise by 90°. The fourth sub-video processor 24*d* rotates the fourth sub-video data clockwise by 90°. In the example illustrated in FIG. 4, it is not necessary to rotate the first sub-video data and the second sub-video data.

The rotation angles of the sub-video data are set in advance according to the positional relationship between the main picture capturing unit 10 and the first sub-picture capturing unit 11 to the fourth sub-picture capturing unit 14 and the respective view angles. For example, if the angle of view of the third sub-picture capturing unit 13 is inclined in the roll direction, the third sub-video processor 24*c* rotates the third sub-video data not at 90° but at an angle corresponding to the inclination. For example, if the first sub-picture capturing unit 11 or the second sub-picture capturing unit 12 is inclined in the roll direction, the first sub-video processor 24*a* or the second sub-video processor 24*b* rotates the first sub-video data or the second sub-video data at an angle corresponding to the inclination.

The first sub-video processor 24*a* cuts out, from first sub-video 11*i*, partial video data 11*c* having a shape corresponding to the free area 10*e* above the main video 10*i*. The position at which the partial video data 11*c* is cut out from the first sub-video 11*i* is not limited to the position illustrated in FIG. 4, and the partial video data can be cut out from an arbitrary position. The first sub-video processor 24*a* may cut out the partial video data 11*c* with a larger size, and reduce the cut partial video data 11*c* to a size of the free area 10*e* above the first sub-video 11*i*. The first sub-video processor 24*a* may not cut out the partial video data 11*c* from the first sub-video 11*i*, but may transform the entire first sub-video 11*i* into a shape corresponding to the free area 10*e* above the main video 10*i*.

Similarly, the second sub-video processor 24*b* cuts out, from the second sub-video 12*i*, partial video data 12*c* having a shape corresponding to the free area 10*e* under the main video 10*i*. The second sub-video processor 24*b* may transform the whole second sub-video 12*i* into a shape corresponding to the free area 10*e* under the main video 10*i*. The third sub-video processor 24*c* cuts out, from third sub-video 13*i*, partial video data 13*c* having a shape corresponding to the free area 10*e* on the left of the main video 10*i*. The third sub-video processor 24*c* may transform the whole third sub-video 13*i* into a shape corresponding to the free area 10*e* on the left of the main video 10*i*. The fourth sub-video processor 24*d* cuts out, from fourth sub-video 14*i*, partial video data 14*c* having a shape corresponding to the free area 10*e* on the right of the main video 10*i*. The fourth sub-video processor 24*d* may transform the whole fourth sub-video 14*i* into a shape corresponding to the free area 10*e* on the right of the main video 10*i*.

The first sub-video processor 24*a* to the fourth sub-video processor 24*d* perform coordinate transformation in accordance with the deformation, rotation, or cutout of the first sub-video data to the fourth sub-video data. The main video processor 23 and the first sub-video processor 24a to the fourth sub-video processor 24d can also execute processes such as gradation correction, color correction, and contour correction in addition to the processes described above.

The combiner 25 includes a frame buffer. The combiner 25 arranges partial video data 11c to 14c generated by the first sub-video processor 24a to the fourth sub-video processor 24d, in the free areas 10e other than the circular video area of each frame of the main video data.

FIG. 5 is a diagram illustrating a combined video 15 after the four pieces of partial video data 11c to 14c are arranged in the main video 10i. As illustrated in FIG. 5, the directions in which the scenes flow are approximated between the inside and outside of the boundary of the circular video area.

The compression coding unit 26 compresses and encodes the combined video data. The compression coding unit 26 compresses and encodes video data using an MPEG-based compression scheme, for example. As an MPEG-based compression scheme, for example, MPEG-2, MPEG-4, H.264/AVC, H.265/HEVC, or the like can be used.

The file generator 27 generates one moving picture file on the basis of a stream of compressed and coded video data. In a case where audio data is acquired by a microphone (not illustrated), the file generator 27 may multiplex the video data and the audio data to generate one moving picture file with audio. For example, the video data and the audio data are stored in one file using the MP4 format. The file generator 27 saves the generated moving picture file in the recorder 28. In this example, the moving picture file to be saved in the recorder 28 is generated by compressing and coding the combined video data. However, if there are no limitations on specifications such as a recording capacity and a processing speed, the first sub-video data to the fourth sub-video data that are not processed for combination may be compressed and coded, and may be saved separately in the recorder 28.

The recorder 28 includes a nonvolatile recording medium. The nonvolatile recording medium may be a removable recording medium or a fixed recording medium built in the video processing apparatus 20. As the removable recording medium, a semiconductor memory card (for example, an SD card), an optical disk (for example, DVD), or the like can be used. As the fixed recording medium, a NAND flash memory chip, an SSD, an HDD, or the like can be used.

Although not illustrated in FIG. 2, the video processing apparatus 20 may be provided with a display unit for displaying a captured video (for example, a liquid crystal display or an organic EL display). Instead of providing the display unit, the captured video may be displayed on the screen of a car navigation system or a smartphone in cooperation with the car navigation system or the smartphone. The removable recording medium may be taken out from the video processing apparatus 20, and the taken out removable recording medium may be loaded into a video reproducing apparatus such as a PC to reproduce a moving picture file stored in the removable recording medium.

Although not illustrated in FIG. 2, the video processing apparatus 20 may be provided with a wireless communication unit. The wireless communication unit can transmit and store the generated moving picture file to a server on a cloud via a wireless network. The wireless communication unit can also stream the combined video to a PC or a server in the monitoring center via a wireless network.

As described above, according to the first embodiment, it is possible to efficiently generate a file of video data captured by the main picture capturing unit 10 including the ultra-wide-angle lens such as a circumferential fisheye lens and the first sub-picture capturing unit 11 to the fourth sub-picture capturing unit 14. That is, it is possible to efficiently record the videos by arranging the videos acquired from the first sub-picture capturing unit 11 to the fourth sub-picture capturing unit 14 in the area around the circular video area acquired from the main picture capturing unit 10. In the video captured through the circumferential fisheye lens, there is no video information in the area outside the circular video area, and waste occurs in the rectangular recordable area. On the other hand, according to the present embodiment, the outer free area can be effectively used.

In a case where a video with a wide field of view is to be recorded by simultaneously capturing pictures using a plurality of picture capturing units, video data is separately recorded for each of the picture capturing units, so that synthesis and synchronization management of the plurality of video data tend to be complicated at the time of reproduction. On the other hand, according to the present embodiment, since the videos captured by the plurality of picture capturing units can be collectively recorded in one video area, it is not necessary to be aware of the synchronization of the plurality of video data at the time of reproduction, and the processing at the time of reproduction can be simplified.

In a case of combining and recording videos captured by a plurality of picture capturing units into one video area, there is no correlation between the motions of the videos, and thus the compression efficiency of the videos is not improved and the data capacity tends to increase in a boundary area between the combined videos.

For example, in an MPEG-based compression coding scheme, inter-frame prediction coding using motion compensation is used. The compression coding unit 26 searches for a prediction area having the smallest error with respect to the macroblock of the current frame in a reference frame neighboring to the current frame in the time direction. The compression coding unit 26 obtains a motion vector indicating a difference between the macroblock of the current frame and the prediction area searched in the reference frame. The compression coding unit 26 compensates for the motion of the macroblock using the obtained motion vector, and generates a difference image between the motion-compensated macroblock image and the image of the prediction area searched in the reference frame. The compression coding unit 26 codes the data obtained by quantizing the orthogonal transform coefficient of the difference image and the motion vector.

In the inter-frame prediction coding using motion compensation, the more uniform the motions of the scenes seen in the macroblock, the smaller the data amount of the difference image can be, whereby the compression efficiency can be improved. In the present embodiment, the sub-video data is rotated so as to bring the motion vectors of the scenes seen in the sub videos arranged around the main video close to the motion vector of the scene seen in the outer peripheral portion of the main video. This makes it possible to reduce the variation in the motion vector of the scene seen in the macroblock in the boundary area between the main video and the sub-videos, and reduce the data amount of the difference image. Therefore, the compression efficiency of the video data in the boundary area can be improved as compared with the case where the sub-video data is combined without being rotated.

Also in a case of searching for a reference area similar to the target area in the same frame and generating and coding a difference image between the image of the target area and the image of the reference area, it is possible to improve the compression efficiency of the video data near the boundary area between the main video and the sub-videos. By rotating the sub-video data so as to bring the motion vectors of the scenes seen in the sub-videos arranged around the main video close to the motion vector of the scene seen in the outer peripheral portion of the main video, it becomes easy to search for a reference area having high similarity with the target area near the boundary, which contributes to reducing the data amount of the difference image. Rotating the sub-video data also contributes to improving the visual continuity of the video near the boundary.

Second Embodiment

Figure 6A:
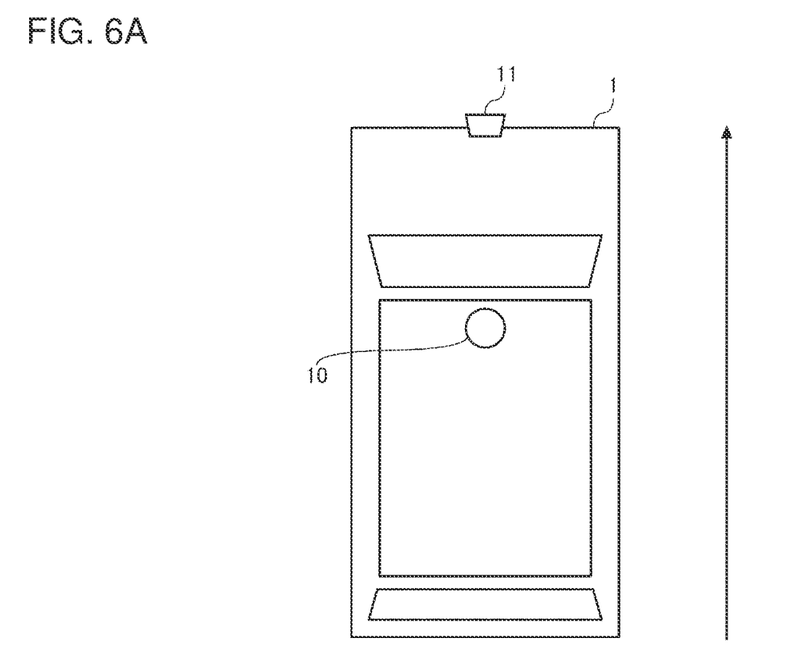
FIGS. 6A and 6B are diagrams illustrating an arrangement example of a main picture capturing unit and a sub-picture capturing unit installed on a vehicle, constituting a video processing system according to a second embodiment.
Figure 6B:
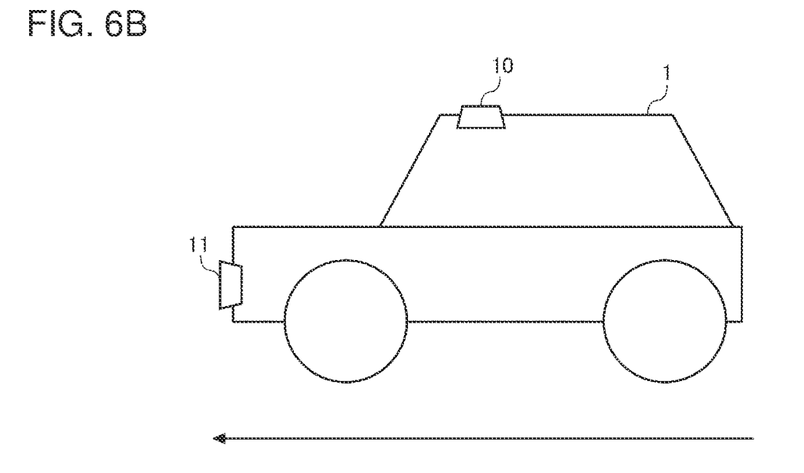

FIGS. 6A and 6B are diagrams illustrating an arrangement example of a main picture capturing unit 10 and a sub-picture capturing unit 11 installed on a vehicle 1, constituting a video processing system according to a second embodiment. FIG. 6A is a top view of the vehicle 1, and FIG. 6B is a left-side view of the vehicle 1. In the second embodiment, the sub-picture capturing unit 11 is one example. The sub-picture capturing unit 11 is attached to the front grille and captures a picture of a scene in front of the vehicle 1.

Figure 7:
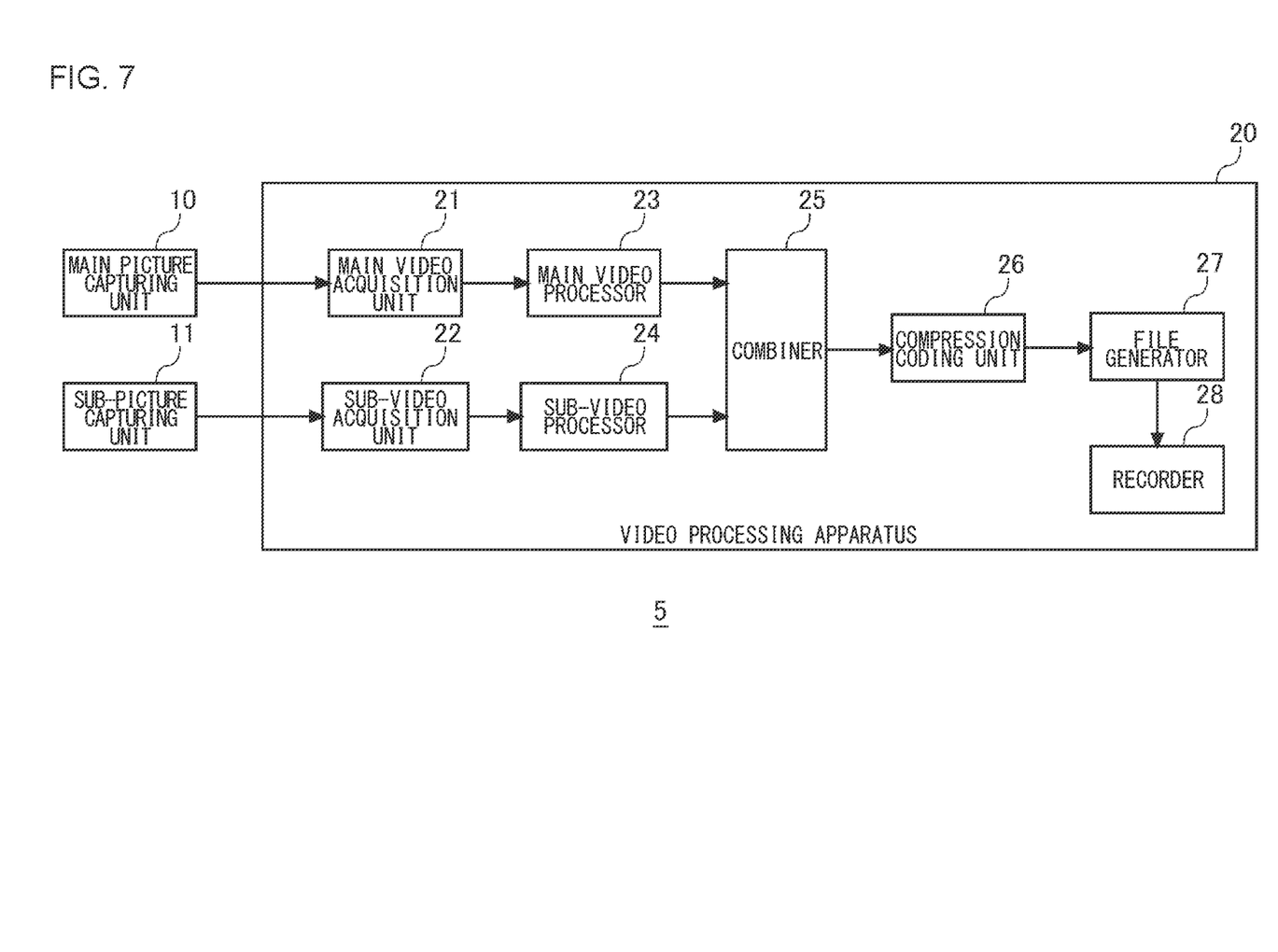
FIG. 7 is a block diagram illustrating a configuration of the video processing system according to the second embodiment.

FIG. 7 is a block diagram illustrating a configuration of a video processing system 5 according to the second embodiment. The video processing system 5 according to the second embodiment is structured such that the second sub-picture capturing unit 12, the third sub-picture capturing unit 13, the fourth sub-picture capturing unit 14, the second sub-video acquisition unit 22b, the third sub-video acquisition unit 22c, the fourth sub-video acquisition unit 22d, the second sub-video processor 24b, the third sub-video processor 24c, and the fourth sub-video processor 24d are removed from the video processing system 5 according to the first embodiment illustrated in FIG. 2. Hereinafter, a specific description will be given with reference to FIGS. 8 to 10.

Figure 8:
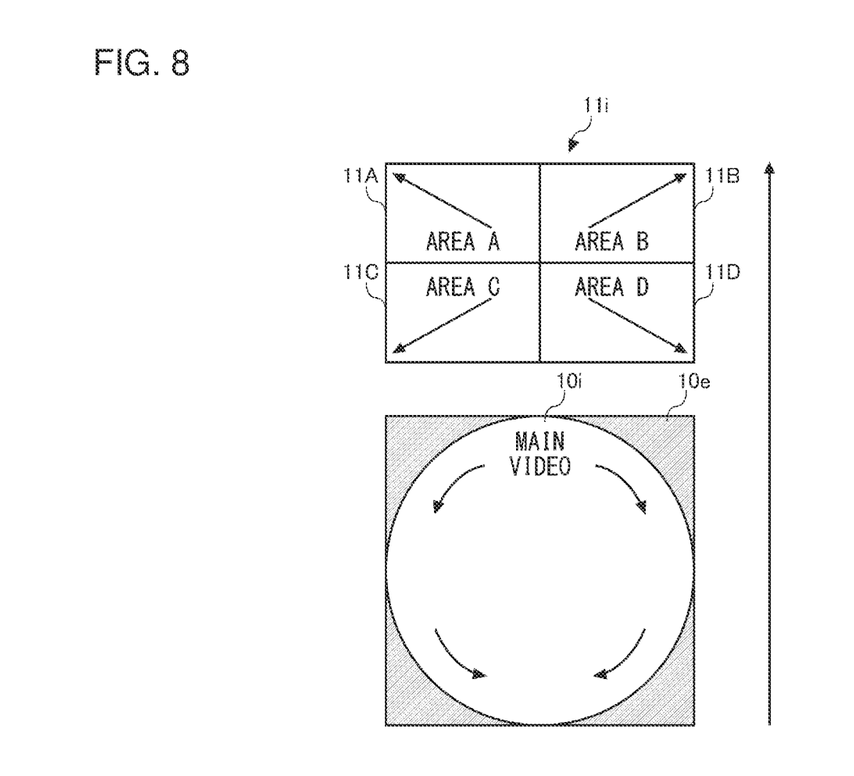
FIG. 8 is a diagram for describing a main video and a sub-video captured by the main picture capturing unit and the sub-picture capturing unit, respectively, according to the second embodiment.

FIG. 8 is a diagram for describing a main video 10i and a sub-video 11i captured by the main picture capturing unit 10 and the sub-picture capturing unit 11, respectively, according to the second embodiment. In FIG. 8, the motion of the scenes seen in the main video 10i and the sub-video 11i in a state where the vehicle 1 moves forward is indicated by arrows. The scenes in the videos are the scenes flowing in a direction opposite to the direction in which the vehicle 1 moves.

In the example illustrated in FIG. 8, a sub-video processor 24 quarters the sub-video 11i in a cross shape to generate a first partial video 11A in an upper left area A, a second partial video 11B in an upper right area B, a third partial video 11C in a lower left area C, and a fourth partial video 11D in a lower right area D.

Figure 9:
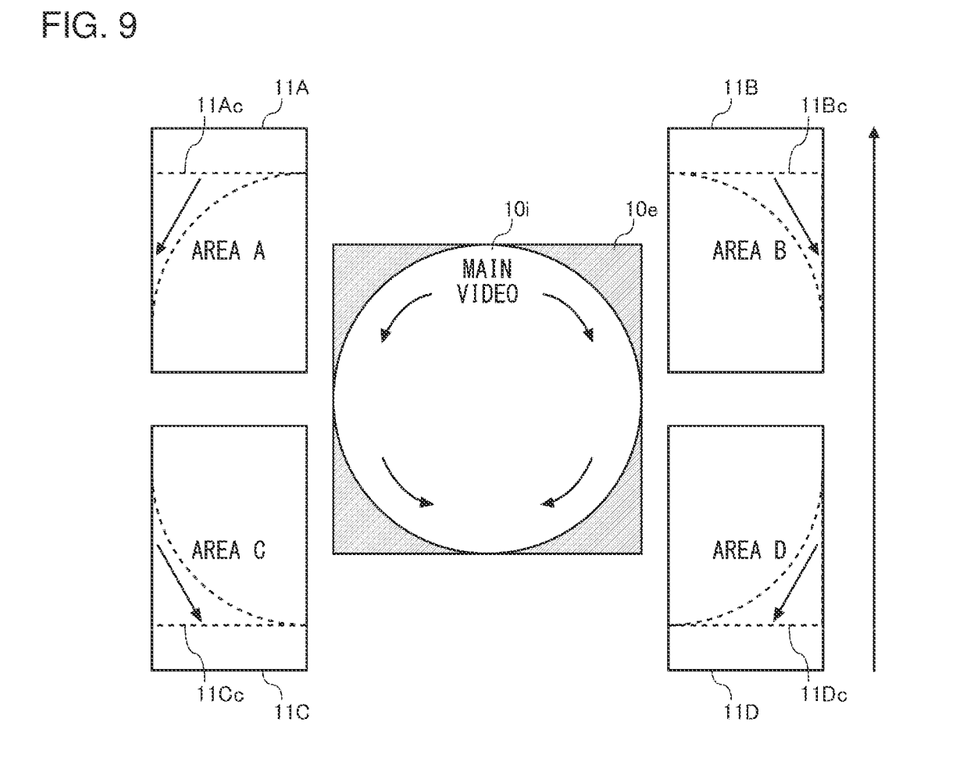
FIG. 9 is a diagram for describing modified processing of the main video and the sub-video captured by the main picture capturing unit and the sub-picture capturing unit, respectively, according to the second embodiment.

FIG. 9 is a diagram for describing modified processing of the main video 10i and the sub-video 11i captured by the main picture capturing unit 10 and the sub-picture capturing unit 11, respectively, according to the second embodiment. In the example illustrated in FIGS. 8 to 10, the first partial video 11A of sub-video 11i is arranged in a free area 10e at the upper left corner of the main video 10i, the second partial video 11B in the sub-video 11i is arranged in a free area 10e at the upper right corner of the main video 10i, the third partial video 11C of the sub-video 11i is arranged in a free area 10e at the lower left corner of the main video 10i, and the fourth partial video 11D of the sub-video 11i is arranged in a free area 10e at the lower right corner of the main video 10i.

The sub-video processor 24 deforms the first partial video 11A to the fourth partial video 11D so as to bring the motion vectors of the first partial video 11A to the fourth partial video 11D close to the motion vectors of the areas neighboring to the free area 10e in the main video 10i according to the motion of the vehicle 1. In the example illustrated in FIG. 9, the sub-video processor 24 rotates the first partial video 11A counterclockwise by 90°, rotates the second partial video 11B clockwise by 90°, rotates the third partial video 11C counterclockwise by 90°, and rotates the fourth partial video 11D clockwise by 90°.

The sub-video processor 24 cuts out, from the first partial video 11A, partial video data 11Ac having a shape corresponding to the free area 10e on the upper left corner of the main video 10i. Similarly, the sub-video processor 24 cuts out, from the second partial video 11B, partial video data 11Bc having a shape corresponding to the free area 10e on the upper right corner of the main video 10i. Similarly, the sub-video processor 24 cuts out, from the third partial video 11C, partial video data 11Cc having a shape corresponding to the free area 10e on the lower left corner of the main video 10i. Similarly, the sub-video processor 24 cuts out, from the fourth partial video 11D, partial video data 11Dc having a shape corresponding to the free area 10e at the lower right corner of the main video 10i. The sub-video processor 24 executes coordinate transformation in accordance with deformation, rotation, or cutout of the sub-video data.

A combiner 25 arranges partial video data 11Ac to 11Dc generated by the sub-video processor 24, in the free areas 10e other than the circular video area of each frame of the main video data.

Figure 10:
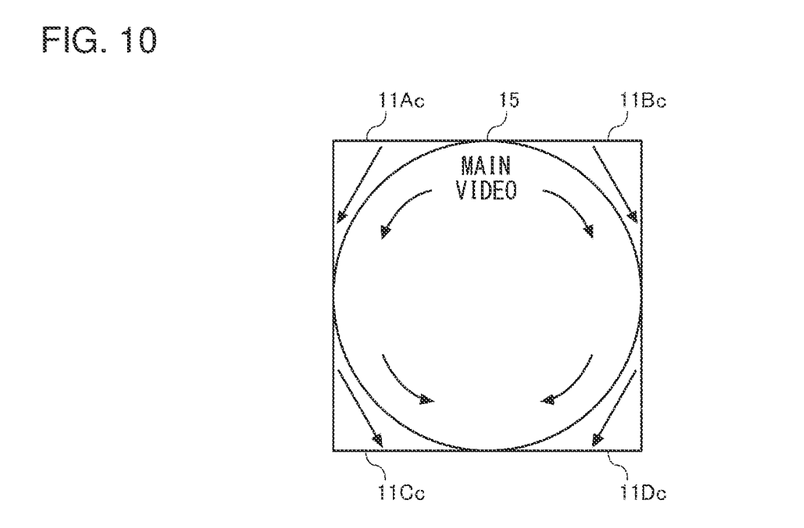
FIG. 10 is a diagram illustrating a combined video in which four pieces of partial video data are arranged in a main video.

FIG. 10 is a diagram illustrating a combined video 15 after the four pieces of partial video data 11Ac to 11Dc are arranged in the main video 10i. As illustrated in FIG. 10, the directions in which the scenes flow are approximated between the inside and the outside of the boundary of the circular video area.

As described above, according to the second embodiment, it is possible to produce the same advantageous effects as those of the first embodiment. Moreover, in the second embodiment, since the number of sub-picture capturing units is smaller than that in the first embodiment, the cost of video processing system 5 can be reduced as compared with the first embodiment.

The present invention has been described above based on the embodiments. The above-described embodiments have been described merely for exemplary purposes. Rather, it can be readily conceived by those skilled in the art that various modification examples may be made by making various combinations of the above-described components or processes, which are also encompassed in the technical scope of the present invention. In addition, modes in which the expressions in the present invention are replaced with method, apparatus, system, recording medium, computer program, or the like are also effective as modes of the present invention.

In the second embodiment, the sub-picture capturing unit 11 captures a picture of a scene in front of the vehicle 1. However, the present invention may be applied to a camera attached to the rear part of the vehicle that captures a picture of a scene behind the vehicle. In this case, when the vehicle 1 moves forward as illustrated in FIG. 8, the directions of arrows of the sub-video 11i are reversed. However, changing the rotation direction of the sub-video data makes it possible to align the directions in which the scenes flow so as to bring close to each other between the inside and the outside of the boundary of the circular video area. Furthermore, the arrangement of the first partial video 11A to the fourth partial video 11D may be exchanged as appropriate.

In the example illustrated in FIGS. 3 to 5, the third sub-video processor 24c rotates the third sub-video data counterclockwise by 90°, and the fourth sub-video processor 24d rotates the fourth sub-video data clockwise by 90°. In this regard, the third sub-picture capturing unit 13 and the fourth sub-picture capturing unit 14 may be installed with the angles of view rotated in the roll direction in advance. Specifically, the third sub-picture capturing unit 13 and the fourth sub-picture capturing unit 14 are installed in directions in which the front side of the vehicle 1 is seen on the upper side of the captured video and the rear side of the vehicle 1 is seen on the lower side when the vehicle 1 is moving forward. In this case, the third sub-video processor 24c and the fourth sub-video processor 24d do not need to rotate the third sub-video data and the fourth sub-video data, respectively. As described above, the arrangements and orientations of the main picture capturing unit 10 and the first sub-picture capturing unit 11 to the fourth sub-picture capturing unit 14 are adjusted in advance such that the motion vector of the scene appearing in the outer peripheral portion of the main video and the motion vectors of the scenes appearing in the sub-videos arranged around the main video are aligned, whereby the compression efficiency of the video data in the vicinity of the boundary area can be improved without the need for advanced video processing.

In the first and second embodiments described above, the vehicle 1 is assumed as a target in which the video processing system 5 is installed. In this regard, the video processing system 5 may be installed in a moving object other than a vehicle. For example, the video processing system 5 may be installed in a motorcycle, a bicycle, a railway vehicle, a ship, an airplane, a multi-copter (drone), or the like.

In the first embodiment, the first sub-video processor 24a to the fourth sub-video processor 24d may dynamically derive the motion vectors of first sub-video 11i to the fourth sub-video 14i according to the motion vector of the area neighboring to the free area 10e of the main video 10i according to the motion of the moving object, and adaptively adjust the rotation angles of the first sub-video data to the fourth sub-video data. For example, the main video processor 23 derives the motion vectors of individual areas of the main video 10i such that the difference between the areas of frames neighboring to each other in the time direction of the main video 10i is minimized. The first sub-video processor 24a derives the motion vector of the first sub-video 11i such that the difference between the frames neighboring to each other in the time direction of the first sub-video 11i is minimized. The first sub-video processor 24a rotates the first sub-video 11i such that the motion vector of the first sub-video 11i approximates the motion vector of the area of the main video 10i neighboring to the area where the first sub-video 11i is to be arranged.

In the second embodiment, similarly, the sub-video processor 24 may dynamically derive the motion vectors of the partial areas A to D of the sub-video 11i according to the motion vector of the area neighboring to the free area 10e of the main video 10i according to the motion of the moving object, and adaptively adjust the rotation angles of the first partial videos 11A to the fourth partial video 11D.

In the first and second embodiments described above, the main video is located in the circular effective video area, and the sub-videos are located in the rectangular video areas. However, the present invention is not limited thereto. For example, depending on the shape of the effective pixel area projected onto the fixed picture capturing element through the lens portion or the effective pixel area set in advance, the main video may be located in a video area of a shape having a curved portion, which is not limited to a circular shape, such as a barrel shape or a semicircular shape. The shape having the curved portion may have a curved portion and a straight portion. The curved portion may have a polygonal shape in which straight portions are connected to form a substantially arc shape. Similarly, the present invention can also be carried out in a case where videos of irregular shapes are used as sub-videos.

What is claimed is:

1. A video processing apparatus comprising:
   a first acquisition unit structured to acquire main video data including a video area of a shape having a curved portion from a main picture-capturing unit installed at a predetermined position in a moving object;
   a second acquisition unit structured to acquire sub-video data from a sub-picture capturing unit installed at another position in the moving object;
   a combiner structured to combine video data that is generated on the basis of the sub-video data and has a shape fitting to a free area other than the video area of each frame of the main video data, and arrange the video data in the free area;
   a generator structured to generate one moving picture file on the basis of the combined video data; and
   a processor structured to process the sub-video data to generate video data having a shape that fits in the free area, wherein
   the processor executes processing including a process of deforming the sub-video data so as to bring a motion vector of the sub-video close to a motion vector of an area neighboring to the free area in the main video according to a motion of the moving object.

2. The video processing apparatus according to claim 1, wherein
   the sub-picture capturing unit is installed at four positions on a front side, a rear side, a left side, and a right side of the moving object, and
   the combiner arranges, above the main video data, video data generated based on sub-video data acquired from the sub-picture capturing unit installed in front of the moving object,
   the combiner arranges, below the main video data, video data generated based on the sub-video data acquired from the sub-picture capturing unit installed behind the moving object; and
   the combiner arranges, on a left side of the main video data, video data generated based on the sub-video data acquired from the sub-picture capturing unit installed on a left side of the moving object,
   the combiner arranges, on a right side of the main video data, video data generated based on the sub-video data acquired from the sub-picture capturing unit installed on a right side of the moving object,
   the processor executes processing including a process of rotating the sub-video data acquired from the sub-picture capturing unit installed on the left side of the moving object, and
   the processor executes processing including a process of rotating the sub-video data acquired from the sub-picture capturing unit installed on the right side of the moving object.

3. The video processing apparatus according to claim 1, wherein
   the sub-picture capturing unit is installed in front of the moving object, the processor processes four pieces of partial video data obtained by dividing the sub-video data acquired from the sub-picture capturing unit into four, and generates four pieces of partial video data having shapes of free areas at four corners, and the combiner arranges the four pieces of video data in the corresponding free areas at the four corners.

4. A video processing system comprising:

a main picture-capturing unit installed at a predetermined position in a moving object;

a sub-picture capturing unit installed at another position in the moving object; and the video processing apparatus according to claim 1.

5. A video processing method comprising:

acquiring main video data including a video area of a shape having a curved portion from a main picture-capturing unit installed at a predetermined position in a moving object;

acquiring sub-video data from a sub-picture capturing unit installed at another position in the moving object;

processing the sub-video data to generate video data having a shape that fits in the free area;

combining video data that is generated on the basis of the sub-video data and has a shape fitting to a free area other than the video area of each frame of the main video data, and arrange the video data in the free area; and generating one moving picture file on the basis of the combined video data, wherein the processing the sub-video data including executing processing including a process of deforming the sub-video data so as to bring a motion vector of the sub-video close to a motion vector of an area neighboring to the free area in the main video according to a motion of the moving object.

6. The video processing method according to claim 5, wherein the sub-picture capturing unit is installed at four positions on a front side, a rear side, a left side, and a right side of the moving object, and the combining including:

arranging, above the main video data, video data generated based on sub-video data acquired from the sub-picture capturing unit installed in front of the moving object;

arranging, below the main video data, video data generated based on the sub-video data acquired from the sub-picture capturing unit installed behind the moving object;

arranging, on a left side of the main video data, video data generated based on the sub-video data acquired from the sub-picture capturing unit installed on a left side of the moving object; and arranging, on a right side of the main video data, video data generated based on the sub-video data acquired from the sub-picture capturing unit installed on a right side of the moving object; and the processing the sub-video data including:

executing processing including a process of rotating the sub-video data acquired from the sub-picture capturing unit installed on the left side of the moving object; and executing processing including a process of rotating the sub-video data acquired from the sub-picture capturing unit installed on the right side of the moving object.

* * * * *